United States Patent
Paskalev et al.

(10) Patent No.: US 7,542,155 B2
(45) Date of Patent: Jun. 2, 2009

(54) PREPARATION OF AGGREGATE JOBS FOR PRODUCTION

(75) Inventors: Boris I. Paskalev, Cambridge, MA (US); Henri B. Weinberg, Lexington, MA (US); Christian H. Hescock, Cambridge, MA (US); Jay T. Moody, Wayland, MA (US); Craig A. Fowler, Grosse Pointe Park, MI (US)

(73) Assignee: Vistaprint Technologies Limited, Hamilton (BM)

( * ) Notice: Subject to any disclaimer, the term of this patent is extended or adjusted under 35 U.S.C. 154(b) by 205 days.

(21) Appl. No.: 11/526,311

(22) Filed: Sep. 25, 2006

(65) Prior Publication Data

US 2008/0080006 A1    Apr. 3, 2008

(51) Int. Cl.
*G06F 15/00*  (2006.01)
*G06K 1/00*  (2006.01)
(52) U.S. Cl. ..................... 358/1.13; 358/1.15; 358/1.16
(58) Field of Classification Search ................ 358/1.15, 358/1.16, 1.13; 399/82
See application file for complete search history.

(56) References Cited

U.S. PATENT DOCUMENTS 5,987,226 A * 11/1999 Ishikawa et al. ........... 358/1.13
7,148,985 B2 * 12/2006 Christodoulou et al. .... 358/1.15
7,386,246 B2 *  6/2008 Yabe ........................... 399/82
2006/0033958 A1 *  2/2006 d'Entrecasteaux ......... 358/1.16
2007/0070379 A1 *  3/2007 Rai et al. ................... 358/1.13

* cited by examiner

*Primary Examiner*—Edward L Coles
*Assistant Examiner*—Satwant K Singh
(74) *Attorney, Agent, or Firm*—Robert L. Dulaney; Jessica J. Costa

(57) ABSTRACT

System and method for automated scheduling and creation of gangs of individual jobs for production. Individual jobs and related production parameters and order information are retained electronically in a database of pending jobs awaiting production. Based on production capacity at the production facility and the production parameters of the individual pending jobs in the database, a plurality of gang shells having defined production parameters, but not having specific individual jobs associated therewith, are defined and used for scheduling equipment and personnel at the production facility during a work shift or other desired period of time. The specific individual jobs for a gang are selected from the database relatively shortly prior to the gang's scheduled production time.

15 Claims, 4 Drawing Sheets

PREPARATION OF AGGREGATE JOBS FOR PRODUCTION

FIELD OF THE INVENTION

This invention relates to the printing or other manufacturing of electronic files.

BACKGROUND OF THE INVENTION

Printing services Web sites allowing a user to access the site from the user's home or work and design custom products for personal or commercial use are well known and widely used by many consumers, professionals, and businesses. For example, through the site VistaPrint.com, VistaPrint Limited markets a variety of printed products, such as business cards, postcards, brochures, holiday cards, letterhead, announcements, invitations and the like. Typically, printing services sites allow the user to select a customizable design template prepared by the services provider and use online tools provided by the site to incorporate the user's personal information and content into the template to create a custom product design. When the design is completed to the user's satisfaction, the user can place an order through the site for production and delivery of a desired quantity of the corresponding printed product. When an order is placed, the user's electronic document design and related printing parameters, such as indicators of the quantity to be produced, the type of paper stock to be used, and the required delivery date to the user, are stored electronically in a database of pending print jobs for use by the printing services provider in scheduling and producing the printed product.

For a printing services provider engaged in printing large numbers of relatively short run individual orders for personalized products, it is advantageous to assemble many of the individual print jobs into a larger aggregate print job or "gang" having similar print requirements, e.g., paper stock, quantity to be produced, required post-printing processing, and whether the product is to be printed in color on both sides or only one. The ganging of many individual print jobs into a single aggregate print job file allows many individual products to be printed simultaneously on relatively large sheets of paper or other material using large format printing presses. After printing, the printed sheets are cut to separate the various individual printed products for subsequent packaging and shipment to the individual customers. U.S. Pat. No. 6,650,433 entitled "Managing Print Jobs", the entire disclosure of which is hereby incorporated by reference, discloses a system for the creation and printing of aggregate print job files comprised of a number of individual print jobs In the past, the gangs to be printed during a given production period were typically all created well in advance of the time of actual printing. For example, once per day, usually at some point during the preceding night, the service provider would execute a ganging program to search a database of pending print jobs and generate the gangs to be produced during the next business day or possibly later.

The creation of production gangs well before the time of actual production has several drawbacks. For example, the circumstances existing at the time of gang creation may have significantly changed before the gang can be produced. For example, one or more documents in a gang may have been modified or cancelled after gang creation. In this situation, to avoid disrupting the production schedule of all of the other documents in the gang, the printing services provider will typically choose to proceed with the printing of the gang and then discard those modified or cancelled documents, resulting in wasted materials and a lost opportunity to print another document in that gang position. Also, after the gangs are generated, there may be an unexpected equipment malfunction or unexpected staffing issues, such as illness or inclement weather that unexpectedly prevented some production personnel from being at work. Further, because a printing services Web site is constantly available to its customers, new product production requests are being received from customers 24 hours a day. High priority or rush printing requests may be received by the site shortly after the daily gang creation process was completed, resulting in a day's delay before the associated print job can be incorporated into a gang at the next scheduled gang creation time. As yet another drawback, if a product in a gang becomes damaged during processing or for another reason requires reprinting, a day's delay will typically be encountered before that product is incorporated into another gang. The delaying of production of a product by even one day may cause the printing services provider to incur increased shipping charges by requiring the provider to employ a more expensive expedited shipping means to get the product to the customer by the promised delivery date. In some cases, the delay may result in the product not reaching the customer by the delivery date, leading to customer dissatisfaction, refunds and, potentially, the loss of future business.

The above described drawbacks in the prior art are not limited to the printing of gangs of documents, but apply also to any type of manufacturing or processing involving the automated ganging or aggregation of multiple individual electronic job files for convenience or efficiency of production, such as multiple individual job files ganged together for etching, embossing, engraving, or other types of processing.

There is, therefore, a need for automated systems and methods that both (a) provide advance gang scheduling to advise production facility personnel of the type of production tasks and materials required during one or more upcoming work shifts and (b) provide increased flexibility to handle and adapt to high priority orders and unexpected problems by delaying the final creation of production gangs until shortly before the production process

SUMMARY

The present invention is directed at satisfying the need for automated systems and methods for scheduling and creating gangs of multiple individual jobs for production.

In accordance with one embodiment of the invention, the printing parameters associated with pending individual print jobs are searched to define a plurality of gang shells representing gangs planned to be subsequently created and printed. Based on the gang shells and the printing capacity at the printing facility, a schedule for the printing of at least some of the gangs represented by the gang shells is developed. The gangs to be printed are not created until shortly before the gang's scheduled print time.

It is an object of the invention to permit a planning schedule for a work day, work shift or other desired time period to be developed for the equipment and personnel at the manufacturing facility while also permitting the selection of the specific individual jobs to be placed in each gang to be deferred until closer to the scheduled time for production of that gang.

It is an advantage of the invention that production facility personnel can review gang schedule information in advance regarding the type and quantity of products to be produced while the production gangs to be produced are created based on newer information about available pending individual jobs than was available at the time the gang shell schedule was developed.

These and other objects, features and advantages of the invention will be better understood with reference to the accompanying drawings, description and claims.

DETAILED DESCRIPTION

Figure 1:
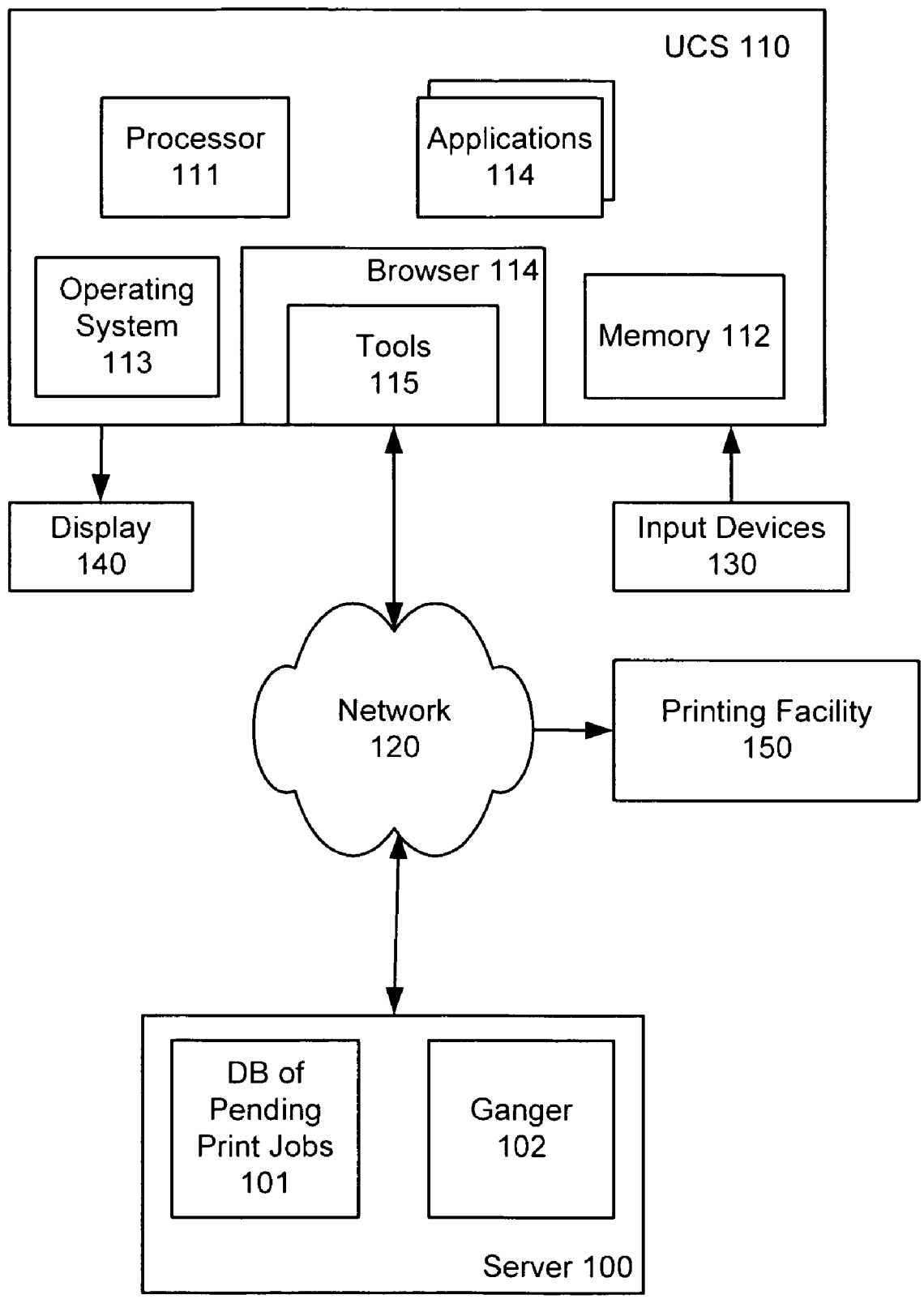
FIG. 1 shows an illustrative system with which the invention may be employed.

FIG. 1 depicts an illustrative environment in which the invention may be employed. Server 100, operated by a printing services provider, maintains pending print job database 101, which includes the electronic descriptions of pending individual print jobs that are awaiting printing. As used herein in describing the embodiment below, the term "individual print job" refers to an individual document design for which an order has been received to print and deliver according to user-selected parameters, including a selected quantity and delivery speed. For example, a request to print a quantity of 250 of a business card design for delivery in 14 days would be an individual printjob. The term "aggregate printjob" refers herein to a larger print file containing a plurality of different individual print jobs that will be printed simultaneously. More broadly, the term "individual job" encompasses both individual print jobs and other individual production jobs files to be produced by other manufacturing or processing methods, such as etching, engraving, and so forth. Similarly, "aggregate job" broadly encompasses any aggregation of individual electronic job files for simultaneous processing or manufacturing. Aggregate jobs are also referred to herein as "gangs" and the process of selecting and organizing a plurality of individual jobs into a gang is referred to as "ganging".

UCS 100 is a typically equipped personal computer running Web browser program 114 such as Internet Explorer from Microsoft Corporation and having a processor 111, an operating system 113 such as a version of the Windows operating system from Microsoft Corporation, a display device 140 such an a CRT or LCD display, input devices 130 such as a keyboard and a mouse, and components and subsystems such as RAM, ROM, and internal and external hard drives, indicated collectively as memory 112. UCS 110 may also be executing one or more application programs 114, such as word processing or graphics design programs. UCS 110 could alternatively be any other device suitable for providing a document to server 100 in electronic form for printing, such as a portable computer, a tablet computer, or a computer system adapted or provided for electronic product ordering, such as a product kiosk, workstation or terminal.

In the depicted embodiment of a Web-based electronic product design system, tools 115 represents product design and ordering programs and tools downloaded to UCS 110 via network 120 from server 100, such as downloadable product design and ordering tools provided by VistaPrint Limited and publicly available at VistaPrint.com. Tools 115 runs in browser 114 and exchanges information and instructions with server 100 during a design session to support the user's preparation of a customized product. When the customer is satisfied with the design of the product, the design can be uploaded to server 100 for storage and subsequent production of the desired quantity of the physical product on appropriate printing and post-print processing systems at printing facility 150. It will be appreciated that an individual print job could alternatively have been generated by another program, such as one of the applications 114, or could have been obtained by UCS 100 from another source.

While a single printing facility 150 is depicted in FIG. 1, it will be understood that a service provider with customers located around the world could advantageously employ multiple printing facilities in different geographical locations. FIG. 1 depicts an embodiment wherein server 100 and printing facility 150 communicate via network 120, such as the World Wide Web. It will be understood that other physical configurations and communications techniques could be employed. For example, server 100 could be located at printing facility 150 such that communications between the server 100 and the computer systems at the printing facility could occur over a local area network or intranet or by other electronic or manual techniques. While server 100 is shown in FIG. 1 as a single block, it will be understood that server 100 could be multiple servers and associated data storage components and subsystems configured to communicate and operate cooperatively to support the Web site operations. Server 100 may be interacting with many user computer systems, such as UCS 100, simultaneously.

Pending print job database 101 at server 100, which could be designed and implemented as multiple separate databases storing different types of individual print job information, contains the electronic product descriptions of pending individual print jobs and various information and status indications associated with each print job. A large Web-based printing services provider may routinely print hundreds of gangs per day containing thousands of different individual print jobs. For this type of volume printing operation, at any given moment database 101 will typically contain many thousands, or possibly tens of thousands, of pending print jobs awaiting ganging and production.

Associated with each pending print job are indications of the product type, the paper stock to be used, the quantity ordered, the customer's account information, delivery date and address, production status, and the like. In the disclosed embodiment, database 101 also includes a cross reference to other products, if any, that were part of the same order and are to be provided to the customer as a single shipment.

As will be discussed in more detail below, ganger 102 is a program executing on server 100 for searching the pending individual print jobs in database 101 and selecting individual print jobs for ganging. In the embodiment disclosed herein, ganger 102 has multiple modes of operation. Ganger 102 could, if desired, be implemented as separate programs or functions.

When operated in a first mode, ganger 102 creates a plurality of "gang shells", which are high-level descriptions of production gangs to be created and produced in the future. Each gang shell defines the general characteristics of a gang, such as the production priority, the paper stock, and the production quantity, but does not contain any specific individual print jobs. In the first mode of operation, ganger 102 also creates a proposed production schedule based on the gang shells and the type, number, and theoretical capacities of the printing systems available at facility 150 and provides the schedule to server 410 as preview schedule 411 for review by the production staff at the printing facility. In the disclosed embodiment, ganger 102 typically generates and schedules gang shells once every 24 hours before the start of a production period, but it will be understood that this operation could be performed more or less frequently, as desired by the printing services provider. As discussed below, ganger 102 may also perform this function one or more times during the production period in reaction to updates from personnel or equipment at the printing facility that require revision of the production schedule.

When operated in a second mode, Ganger 102 creates production gangs corresponding to the gang shells, each production gang having specific individual print jobs assigned to individual positions in the gang. As will be discussed below, production gangs are generally created on an "as needed basis" such that production gangs are created from time to time during the production period.

Figure 2:
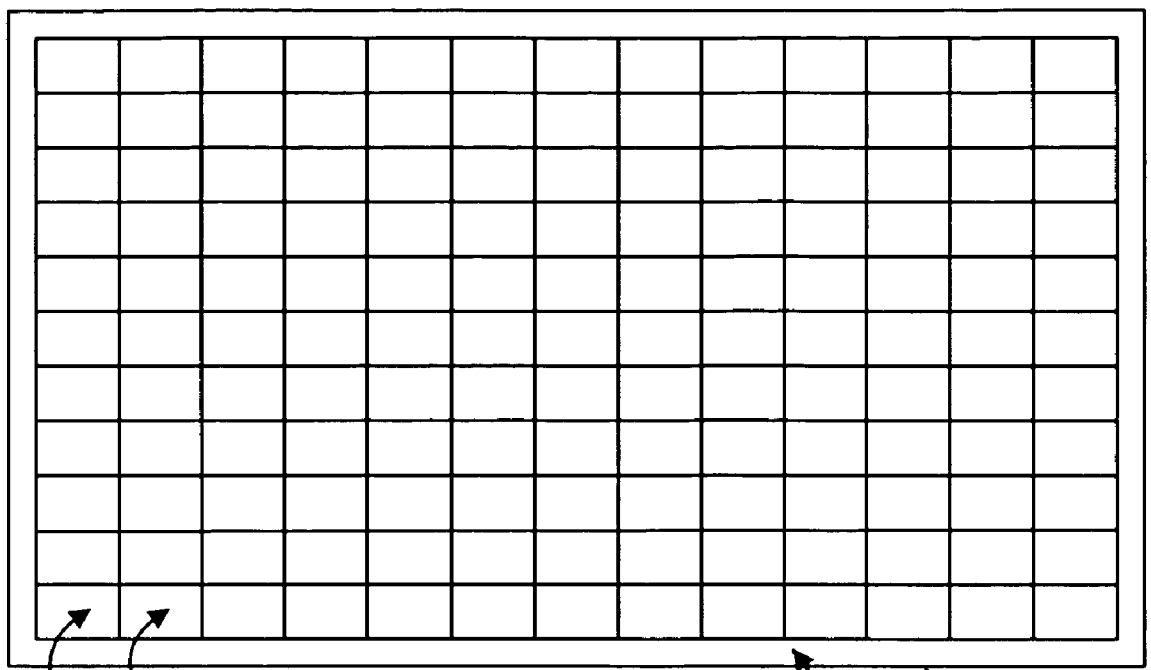
FIGS. 2 and 3 show illustrative examples of aggregate print jobs.

The assembling of many individual print jobs into an aggregate print job for the purpose of simultaneous printing allows the material and production costs associated with using large format printing systems to be shared among all the jobs in the gang, making the share of the production cost for each individual job relatively small. FIG. 2 illustrates gang 200 for the simultaneous printing of many business cards print jobs, each business card being approximately 2 inches by 3.5 inches, on a large format press, for example on a sheet having dimensions of 1.0 meter by 0.6 meter. In this example, gang 200 is an 11 by 13 grid containing individual positions for 143 different individual business card print jobs. In other words, position 201 could be the business card design for customer A, position 202 the business card design for customer B, and so forth. With this gang, 143 separate business card print jobs for 143 different customers can be simultaneously created by assembling the electronic business card files into a single large electronic gang file, printing a desired quantity of copies of the gang file, and cutting the stack of printed gang sheets to separate the printed stack into separate sets of business cards for individual packaging and shipping to the 143 different customers. Gang identifiers, registration marks, date of production, and other information desired by the printing services provider for internal processing and gang tracking can be printed in the available margin area 203.

Figure 3:
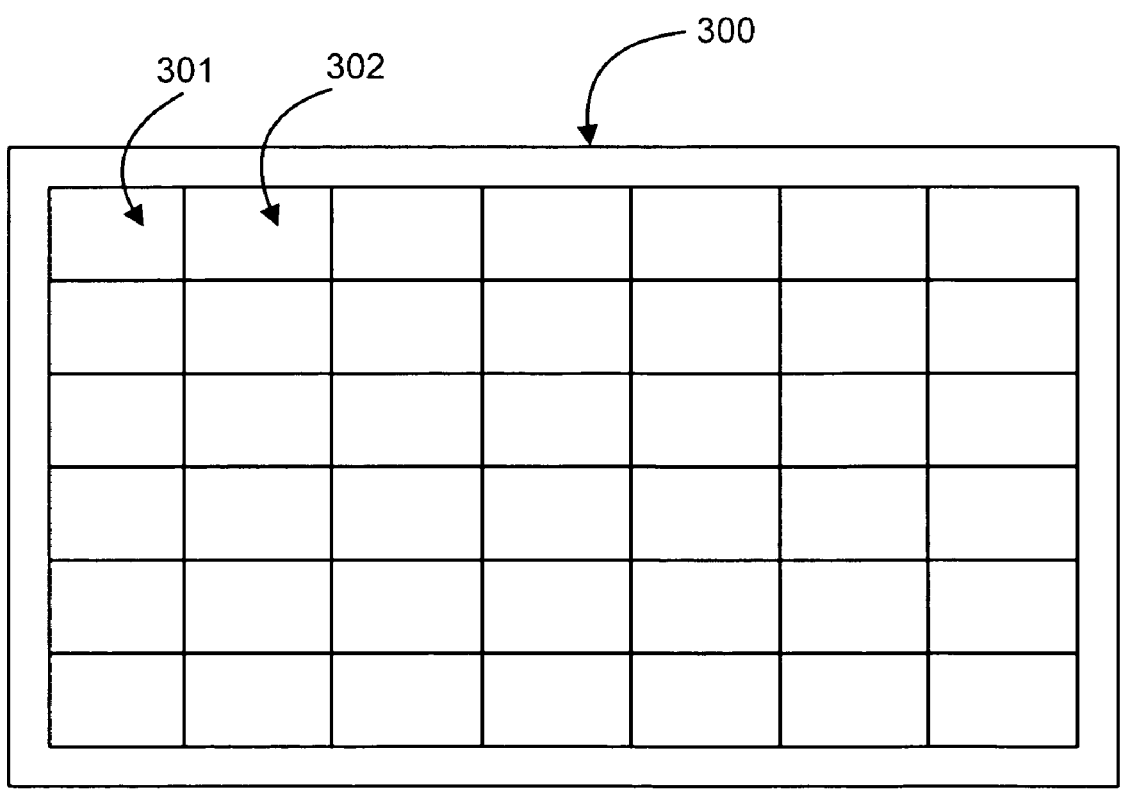

The number of different print jobs that can be accommodated in a single gang will, of course, vary by the dimensions of the particular product. FIG. 3, as another example, illustrates gang 300 for the simultaneous printing of 42 postcards on a sheet of paper similar in size to that discussed above in connection with FIG. 2. In a typical gang, position 301 would contain the postcard design of customer X, position 302 the postcard design of customer Y, and so forth. While gangs comprised of print jobs for the same type of product, such as shown in FIGS. 2 and 3, typically fit on the paper in the most efficient manner with the least wasted space, it will be understood that gangs could be created having two or more different sizes of products in a single gang. For example, a gang layout having both business card positions and postcard positions could be employed, if desired by the printing services provider.

Figure 4:
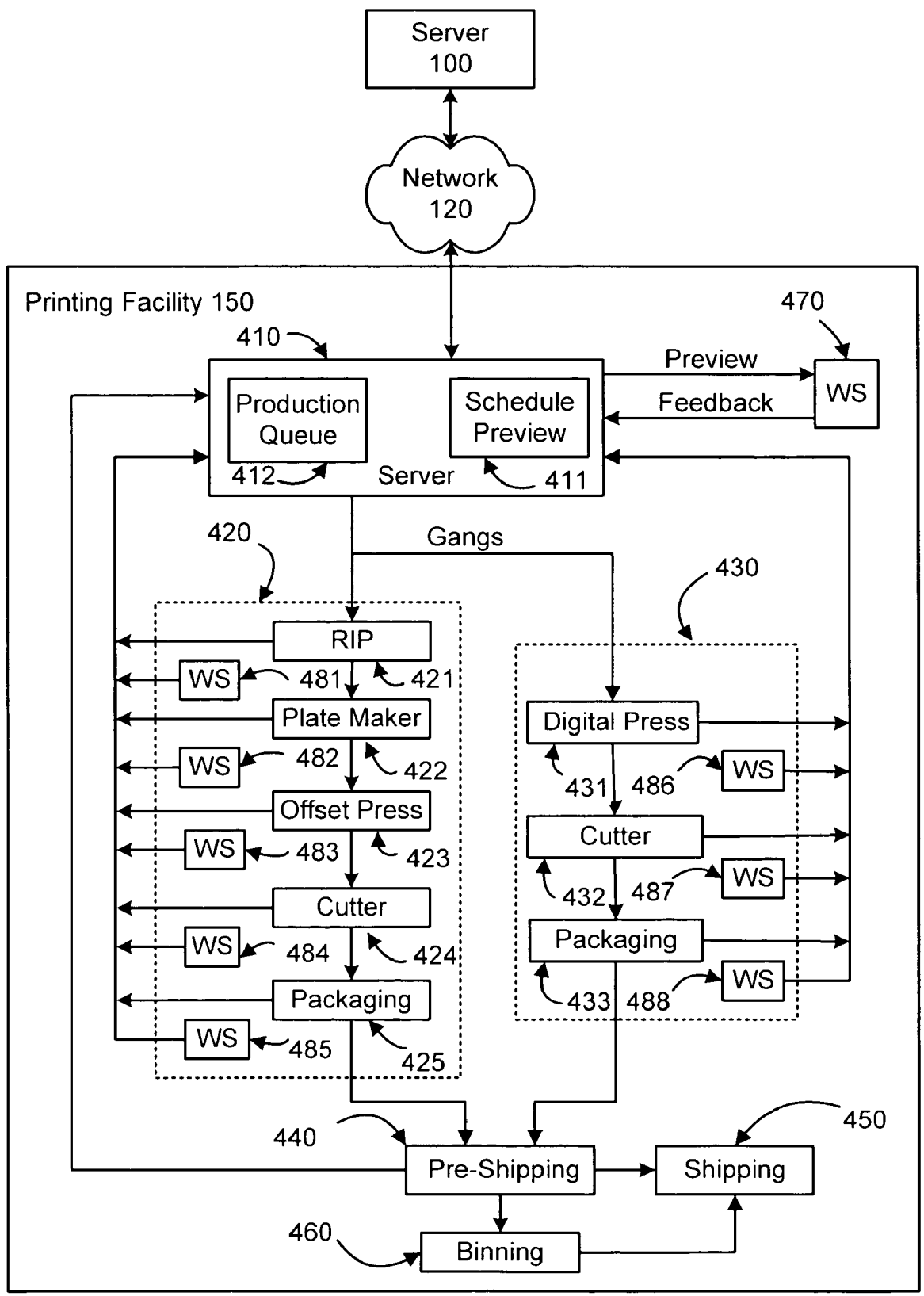
FIG. 4 illustrates the flow of printjobs through a representative printing facility.

FIG. 4 is a representative printing facility 150. In the illustrated embodiment, a single offset press line 420 and a single digital press line 430 are shown for simplicity of presentation, but it will be understood that a large scale printer offering a range of different products would typically have multiple offset press lines and multiple digital press lines in operation in facility 150. Also, it will be understood that the printing services provider could configure the system elements of the printing facility in various other ways if desired. For example, a single plate maker could supply plates for multiple offset presses, a single cutter could handle the cutting operations for multiple presses, a single packaging station could handle the packaging for the output from multiple cutters, and so forth. In addition, as mentioned above, it will be appreciated that the invention is not limited to processing involving the printing of ink on paper, but can be usefully employed in any type of manufacturing process involving the ganging or aggregation of multiple individual production jobs for simultaneous production, such as multiple jobs ganged together for etching, embossing, engraving, or other forms of processing.

At facility 150, the production gang files created at server 100 are initially retained in production queue 410 at printing facility 150. Some production gangs will be created for and supplied to offset press lines while other gangs will be created for and supplied to digital press lines. An offset press has a relatively greater setup cost than a digital press, but has a lower per copy cost for print jobs printed at higher quantities. Server 100 will, therefore, typically assign individual print jobs to an offset or digital production gang primarily on the basis of the quantity to be produced. For example, products ordered in lower quantities such as 10 or 20 would typically be more produced on a digital press while products ordered at larger quantities such as 250 or more would typically be produced on an offset press.

The offset line 420 includes a raster image processor (RIP) 421 for receiving the electronic gang file to be printed in electronic form, for example in PDF format, and converting the received PDF file into four CMYK color-separated electronic files. The files from the RIP are supplied to plate maker 422, which creates the corresponding metal plates for use in offset press 423. RIP 421 and plate maker 422 can be implemented as separate systems or a plate maker having integrated RIP capability can be employed. The plates are then supplied to an offset printing press capable of printing large paper stock, for example a 41-inch Roland 700 press from Man Roland. If the product is to be printing in color on both sides, a total of eight plates (four for each side) are required. Additional processing plates and processes, such as scoring of the sheets or the application of foil, may also be involved for some products. After printing, the stack of printed sheets is supplied to cutter 424, which cuts the sheets along the perimeters of the individual print jobs to separate the individual stacks of printed products, which can then be individually packaged at packaging 425 for mailing to the customer.

In the digital print line 430, the electronic gang file is supplied to digital press 43 1, for example an Indigo digital press from Hewlett-Packard. Digital press 431 performs the required RIP processing and prints the gang file on the desired quantity of sheets. The printed gang sheets are then processed by cutter 432 to separate the individual print jobs, which are packaged at packaging station 433.

It will be understood that additional equipment, not shown, could also be employed depending on the particular types of products offered by the printing services provider. For example, if the printing services provider offers products such as brochures, presentation folders, or envelopes, various additional post-printing processing steps, such as folding, gluing, or additional trimming, could be performed before the product is ready for packaging.

Facility 150 uses a centralized shipping function for packaged products from both the offset press lines and the digital press lines. After packaging, all products are processed at pre-shipping 440 to determine whether the product is to be shipped by itself or is to be shipped in combination with one or more additional products. If a single product was ordered, the packaged product is forwarded directly to shipping 450 for release to a carrier or delivery service to initiate the delivery to the customer's home or office. If multiple products were ordered, these items may be produced on different equipment and, in that situation, different component parts of the order will generally arrive at pre-shipping 440 processing at different times. If the printing services provider desires to ship the entire order at one time, the other item or items in the order that arrive first are placed in a physical holding bin at binning 460 until all items are ready to be shipped. When the final item in the order arrives, all items in the order are packaged for shipment and forwarded to shipping 450.

It is desirable that production of the different products in a single order be coordinated such that all products are produced as close to the same time as is reasonably feasible. Coordination of product production times reduces the average amount of time that products must spend in the bins. This minimizes the amount of floor space that must be devoted to the binning area and, therefore, reduces the physical area that must be covered by the binning staff in the binning and retrieval process. As individual products in a multi-product order are detected at pre-shipping 440, for example by scanning a bar code on the product package or other tracking technique, the status of the associated unprinted pending print jobs in database 101 is updated to indicate that a portion of the order is waiting in binning 460. In the disclosed embodiment, this status increases the priority of all associated unprinted print jobs.

While some or all of the manufacturing systems 421-425 and 431-433 at the printing facility may have the capability to automatically monitor their operation and provide status and fault information to server 100 for use by ganger 102, the staff at the printing facility may have additional information that is not immediately or readily accessible to ganger 102. For example, the printing facility staff may be aware of information such as equipment problems not automatically reported or an unexpected shortage of skilled operators. The production staff is therefore given an opportunity to review a proposed schedule, represented as preview schedule 411, and provide feedback In FIG. 4, workstation WS 470 is depicted for this purpose, but the production staff could access preview schedule 411 from another workstation on the production floor, such as WS 481-488, or possibly from a personal computer, not shown, having access to server 410 from elsewhere in the facility. Preview schedule 411 contains only gang shells for schedule planning purposes. No specific individual print jobs are associated with these gang shells. Only later when actual production gangs are created will the specific individual print jobs be assigned.

The type of feedback solicited or accepted from the production staff is a design decision by the printing services provider. For example, in a system that relies on manual scheduling by the production staff at the printing facility, the staff could be presented with a list of gangs to be produced and be allowed to control the production sequence of individual gangs and the distribution of gangs among the available presses. In a more automated system with less manual control, the assignment of gangs to presses and the sequence of gang production and printing during the day could be controlled by ganger 102 with feedback from the production personnel being limited to specific inputs such as updates on the status of equipment, supplies, or personnel.

During a typical business day, while thousands of individual print jobs are being printed and shipped to customers, thousands of new print jobs are being received. It can be appreciated that the contents of pending jobs database 101 will, therefore, be constantly changing and that it would be advantageous to delay the process of creating production gangs until just before the gang is required to increase the possibility of producing a gang with the most valuable or highest priority collection of individual print jobs. Production gangs to be supplied to the presses for printing are, therefore, created by ganger 102 at different times during the production period on an "as needed" or "just in time" basis. In general, the creation of a production gang for transmission to production queue 412 is delayed until shortly before the press line for which the gang is destined is ready to being work on the gang. As discussed above, it is desirable to produce a production gang as closely to the time of production as possible, but it is undesirable to have a press line at the printing facility become idle because the next production gang that has not yet arrived. Because the PDF file for a production gang containing many individual print jobs will typically be many megabytes in size and because of the possibility of a failure or delay in the transmission of the file between server 100 and facility 150, a margin of safety for file transfer is built into the production gang generation timing. The margin of safety time period employed could be relatively short if ganger 102 is located at facility 150 and the transfer is reliable and would typically be relatively longer if transfer of files over the internet is involved.

The printing services provider may choose to generate and forward one or more production gangs in advance of the anticipated use at the press line such that one or more production gangs should always be available at the printing facility just in case of a temporary interruption in network service or other problem at server 100 in the generation and forwarding of production gangs to the printing facility. Under normal operation, therefore, production gangs will be received ahead of the time they are actually required at the press line and at least one production gang for each press line in operation should be available at the printing facility. Production gangs awaiting distribution to their assigned press lines are maintained in production queue 412 prior to transfer to the appropriate press line.

As indicated in FIG. 4, a number of workstations (WS) 431-438 are positioned at various locations in Facility 150 corresponding to the various printjob processing steps. While the representative example shown in FIG. 4 depicts a workstation for each offset process 421-425 and each digital process 431-435, it will be understood that more or fewer workstations may be employed, based on factors such as the particular types of printing and processing equipment being employed and the equipment configuration. As discussed below, these workstations are used by equipment operators at the printing facility to provide status information or flag problems to server 410 for forwarding to server 100. Based on this operator input, server 100 may cancel one or more entire gangs or remove one or more individual print jobs from a gang currently in process. The status of these individual print jobs in database 101 is changed to indicate that the job is available for ganging.

Production problems occasionally surface during the processing of the print jobs. In general, production problems can be broadly classified as (a) problems affecting only a portion of the individual printjobs in a gang and (b) problems affecting an entire gang. The former category would include situations where most of the individual print jobs in a gang are processed correctly, but one or more jobs within the gang needs to be reprinted. For example, a few individual jobs in a gang could be marred because of a localized scratch on one of the press plates or a properly printed individual print job could be damaged during the packaging process.

The latter category of problems that affect an entire gang, can be further broken down into the subcategories of (a) problems that temporarily disrupt the normal production process and that can be corrected reasonably quickly or easily at the printing facility and (b) problems that are best corrected by canceling and dissolving the entire gang and making all of the individual print jobs in that gang available again in database 101 for assignment by ganger 102 to a new gang. The former subcategory would include various production incidents such as accidental damage to a CMYK plate during installation in the press causing the production of that gang to be delayed until a replacement plate can be created or improper cutting or other damage to a printed gang that requires the gang to be reprinted. In these circumstances, the processing of that gang can be restarted or reinitiated at the appropriate step in the process as soon as the problem is identified and corrected and this type of issue can typically be handled on an ad hoc basis without significant disruption in the overall production schedule and without impacting the operation of ganger 102.

In other circumstances, however, the best option is to cancel one or more existing production gangs. For example, after one or more production gangs have been created at server 100, assigned to a specific press in the printing facility, and forwarded to production queue 412, the assigned press may experience a malfunction that halts the production process. If the malfunction can be corrected in relatively short time, processing of gangs at that press can be temporarily suspended and proceed when the press is repaired. However, if the malfunction is such that it will keep the press out of service for a prolonged period, the gangs currently assigned to that press will be cancelled and the individual print jobs in those gangs will be made available again for incorporation into another gang for another press. Releasing the individual jobs for ganging will allow high priority individual print jobs to be identified as available by ganger 102 and associated with a new gang assigned to a different press. The amount of time the printing services provider waits before canceling a gang can be established by the printing services provider based on factors such as the estimated repair time, the number of other presses available, the number of pending jobs in database 101, and the number of high priority individual print jobs in the production gang or gangs currently assigned to the inoperative press.

To meet the needs of a range of customers, a printing services provider may offer multiple different delivery options at corresponding different price points. For example, for customers requiring rapid turnaround of their product, the services provider may offer various expedited delivery times at an additional charge, such as next day delivery, second day delivery, or seven day delivery. For customers not requiring rapid delivery, the provider may offer various slower deliver times at a reduced or possibly no charge, such as 14- or 21-day delivery. A product order for which the customer has requested next day delivery will need to be produced and shipped that same day and therefore will immediately have a very high priority for ganging purposes. A product for which the customer has requested a slower delivery will initially have a relatively lower priority for ganging purposes, but, as its delivery deadline gets near, if it still has not been produced, its priority will be increased. Regardless of the delivery time requested, it is in the best interests of the printing services provider to meet that delivery commitment. Therefore, associated with each individual job in database 101 will be an associated date indicating the date by which that individual job must be shipped in order to meet the delivery date indicated to the customer.

Figure 5:
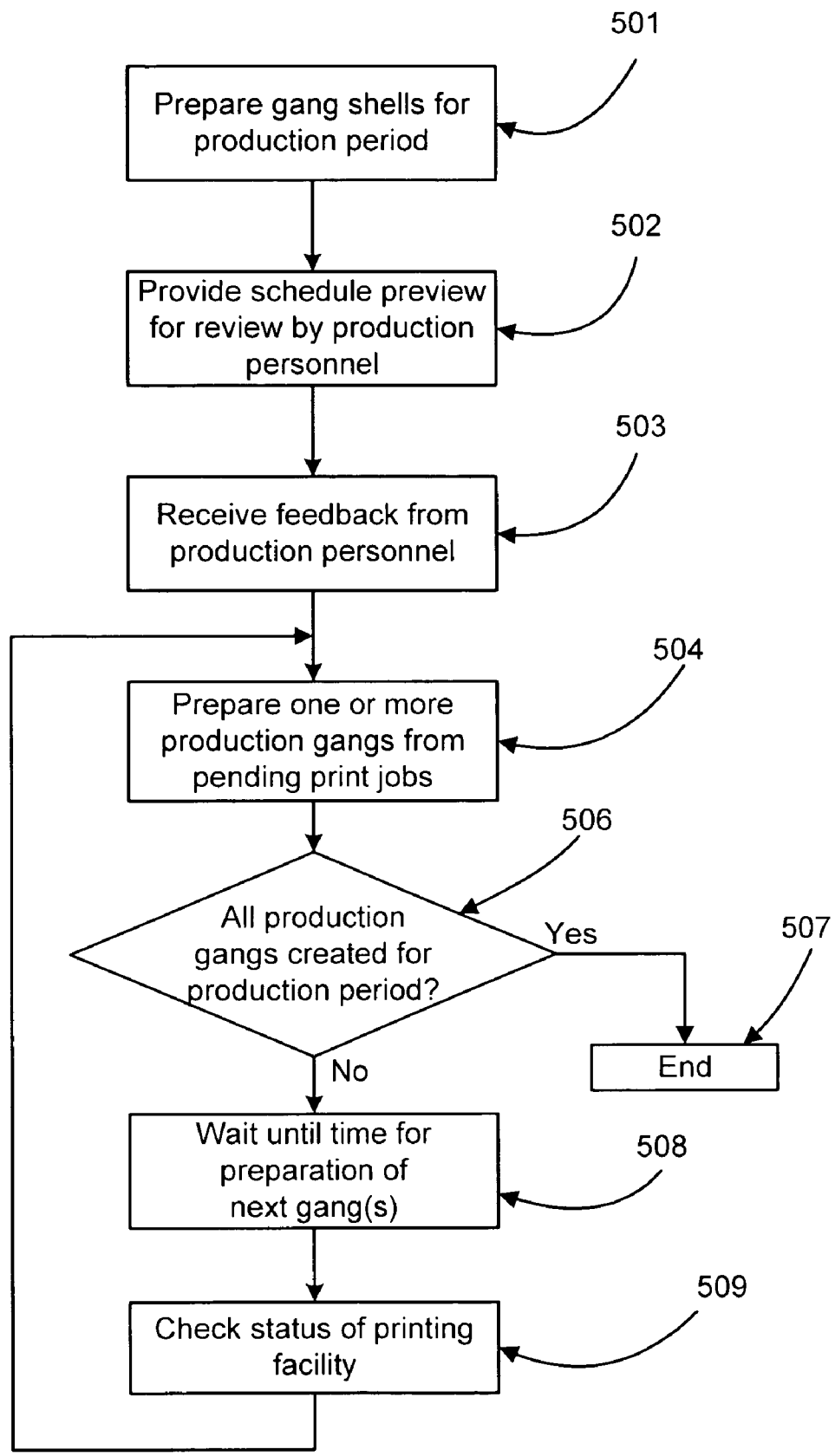
FIG. 5 is a flowchart of one embodiment the invention.

FIG. 5 presents a flow chart of an implementation of the gang scheduling and creation process. At step 501, ganger 102 searches database 101 to identify the high priority individual print jobs that need to be produced during the upcoming production period to allow the service provider to meet its delivery obligations. Based on the number and printing parameters of these high priority jobs, ganger 102 will determine the number of gangs required to produce those high priority jobs. For example, a gang of postcard jobs as illustrated in FIG. 3 can accommodate 42 individual postcard print jobs. If ganger 102 were to determine that 60 individual postcard print jobs require printing the next day, two high priority postcard gang shells. Similarly, ganger will define the required number of gang shells for all different product types having high priority jobs that must be printed the following day.

Except under rare circumstances, the printing of the high priority gangs will not consume all printing time and capacity at facility 150. After all high priority gang shells have been defined, ganger 102 will determine how much manufacturing capacity remains and will define additional gang shells to be produced after the high priority gangs have been completed. Ganger 102 will then automatically determine the order of printing of the gangs and assign each of the individual gang shells to one of the various printing presses at facility 150. In assigning gangs to presses and determining the order of printing of the gangs, ganger 102 will, to the extent feasible, try to "batch" together gangs using the same print processing and paper stock to minimize the requirement for paper changes and other adjustments at the press. As an alternative to automatic gang ordering and press assignment at server 100, ganger 102 could be implemented to provide descriptions of the gang shells to printing personnel at facility 150 and allow those personnel to control the assignment of the gang shells to the available presses.

At step 502, a production schedule preview for the upcoming production period is made available for review by printing personnel at facility 150. As discussed above, the personnel at the print facility may be aware of issues that impact the ability of the facility to execute the production schedule as currently configured. At step 503, the production personnel review the schedule and provide any comments, recommendations, or other feedback via WS 470 to ganger 102. If the feedback is such that the planned production schedule as presented in the preview schedule cannot be met, for example due to unexpected equipment problems, ganger 102 will generate a new production schedule reflecting the updated circumstances at the printing facility.

Based on the production schedule, as updated to reflect any updates from step 503, ganger will begin the creation of the production gangs at step 504. The first productions gangs of the day will be filled with the high priority individual print jobs that the printing services provider desires to print and ship that day. Any available individual print jobs positions in the gang that are still available after all high priority jobs have been accommodated are assigned to lower priority print jobs.

While the required delivery date of an individual print job is a key factor used by ganger 102 in selecting pending print jobs for ganging, the printing services operator can employ additional factors to adjust the ganging priority of individual jobs. For example, as mentioned above, if a product is being held in a bin awaiting production of another product, the ganging priority of the remaining products that have not yet been ganged can be increased. Similarly, high revenue products or products from a preferred customer can also receive higher priorities, resulting in earlier ganging and production than would otherwise have been the case.

After the individual print jobs have been assigned to the positions in the gang, the electronic documents associated with the individual print jobs are retrieved from database 101 and the gang is created. The preparation of the gang for transmission to facility 150 depends on the particular processing capabilities and requirements of the printing systems to be used for the gang. For a gang to be printed on offset press line 420, the individual print jobs are combined at server 100 into a single large electronic PDF document file for transmission to production queue 412 and then to RIP 421. For a gang to printed on digital press line 430, the individual files are transmitted to facility 150 along with a descriptor file telling digital press 431 how the individual print jobs are to be arranged in the gang. Press 431 will position the individual jobs for printing according to the descriptor file instructions.

If the day's production of gangs has not yet been completed at step 506, ganger 102 will wait at step 508 until the appropriate time to prepare the next gang. At any time during the production period, problems can arise at printing facility 150 causing equipment to become unavailable or causing scheduled gang shell to be cancelled, therefore, before creating each additional gang, the current status and status updates from facility 150 are checked at step 509 to determine if the current production schedule is still viable or if production schedules or press assignments need to be revised. After making any required schedule adjustments at step 509, the gang creation process repeats until the day's production of gangs has been completed.

While an exemplary embodiment of the invention has been discussed, the described embodiment is to be considered as illustrative rather than restrictive. The scope of the invention is as indicated in the following claims and all equivalent methods and systems.

What is claimed is:

1. An automated method for creating gangs of individual jobs for production at a production facility, the method comprising:
    retaining in electronic form a plurality of individual jobs, each individual job having one or more associated production parameters;
    based on at least the available production capacity at the production facility and the production parameters of the individual jobs, defining a plurality of gang shells representing gangs planned to be subsequently created and produced;
    based on at least the defined gang shells, developing a schedule for the production of at least some of the gangs represented by the gang shells during a time period; and
    creating each gang to be produced such that the gang will be available to the production facility in advance of the gang's scheduled production time.

2. The method of claim 1 wherein the creation of each gang is performed shortly before the gang's scheduled production time.

3. The method of claim 1 wherein the schedule for the production of the gangs is revised if the available production capacity at the production facility changes.

4. The method of claim 1 wherein developing the schedule for production of the gangs includes developing a first schedule, providing the first schedule to production facility personnel for review, and developing a revised schedule based on feedback from the production facility personnel.

5. The method of claim 1 wherein a defined gang shell may be removed from the schedule such that a gang will not be created for that gang shell.

6. The method of claim 1 wherein each gang shell is assigned a priority level and wherein the developing of a schedule for production is further based on the assigned priority levels of the gang shells.

7. The method of claim 6 wherein the individual job production parameters include an indication of the requested date of delivery to the customer of the produced individual job and wherein the priority level assigned to each gang shell is based on at least the earliest requested individual date of delivery of the individual jobs in the gang.

8. The method of claim 1 wherein the retained individual jobs include individual jobs for a plurality of different types of products and further comprising determining the types of products to be produced during the time period.

9. The method of claim 8 further comprising creating one or more gang shells for each type of product to be printed during the time period.

10. The method of claim 1 wherein the defining of the plurality of gang shells is further based on anticipated changes to the contents of the database of pending individual jobs after the gang shells are defined.

11. The method of claim 10 wherein the anticipated change is the addition of more individual jobs to the database.

12. The method of claim 10 wherein the anticipated change is the requirement to reproduce previously produced individual print jobs.

13. The method of claim 1 wherein the individual jobs are individual print jobs and further comprising printing a desired quantity of at least one gang to create a plurality of printed copies, cutting the plurality of copies to separate the individual print jobs, and packaging the individual print jobs for individual delivery.

14. A system comprising
    at least one production system,
    a plurality of individual jobs retained in electronic form and having one or more production parameters associated therewith,
    a ganger capable of defining a plurality of gang shells based on at least the production parameters and the production capability of the at least one production system, the gang shells representing gangs planned to be subsequently created and printed,
    a scheduler capable of developing a schedule for production of at least some of the gangs represented by the gang shells, and
    a ganger capable of creating gangs to be printed.

15. A computer readable medium having embodied thereon computer executable instructions for performing the method of claim 1.

* * * * *